US009317403B2

(12) United States Patent
Simons et al.

(10) Patent No.: US 9,317,403 B2
(45) Date of Patent: Apr. 19, 2016

(54) METHOD FOR CREATING A LABEL

(71) Applicant: TestPlant Limited, London (GB)

(72) Inventors: Douglas Paul Simons, London (GB); Jonathan David Gillaspie, London (GB)

(73) Assignee: TestPlant Limited, London (GB)

(*) Notice: Subject to any disclaimer, the term of this patent is extended or adjusted under 35 U.S.C. 154(b) by 179 days.

(21) Appl. No.: 14/052,151

(22) Filed: Oct. 11, 2013

(65) Prior Publication Data

US 2014/0325482 A1 Oct. 30, 2014

Related U.S. Application Data

(60) Provisional application No. 61/816,111, filed on Apr. 25, 2013.

(30) Foreign Application Priority Data

Oct. 9, 2013 (GB) .................................. 1317856.1

(51) Int. Cl.
*G06K 9/00* (2006.01)
*G06F 11/36* (2006.01)

(52) U.S. Cl.
CPC ........ *G06F 11/3684* (2013.01); *G06F 11/3664* (2013.01)

(58) Field of Classification Search
None
See application file for complete search history.

(56) References Cited

U.S. PATENT DOCUMENTS

| 5,465,353 | A | * | 11/1995 | Hull et al. |
| 5,784,487 | A | | 7/1998 | Cooperman |
| 6,169,998 | B1 | * | 1/2001 | Iwasaki et al. ................. 715/202 |
| 6,377,704 | B1 | * | 4/2002 | Cooperman .................. 382/176 |
| 6,674,900 | B1 | * | 1/2004 | Ma et al. ........................ 382/176 |
| 7,460,735 | B1 | * | 12/2008 | Rowley et al. ................ 382/305 |
| 8,751,508 | B1 | * | 6/2014 | Peracha ............ G06F 17/30997 705/26.7 |
| 8,855,430 | B1 | * | 10/2014 | Alldrin et al. .................. 382/224 |
| 2002/0031281 | A1 | * | 3/2002 | Chiba et al. .................... 382/305 |
| 2002/0120653 | A1 | | 8/2002 | Kraft et al. |
| 2009/0273597 | A1 | | 11/2009 | Chatamballi et al. |
| 2010/0079822 | A1 | * | 4/2010 | Ohk .............................. 358/451 |
| 2010/0125568 | A1 | * | 5/2010 | van Zwol et al. ............. 707/722 |
| 2010/0284623 | A1 | * | 11/2010 | Chen et al. .................... 382/224 |
| 2012/0324341 | A1 | * | 12/2012 | Dejean .......................... 715/243 |
| 2013/0156322 | A1 | * | 6/2013 | Yaros ................... G06K 9/3266 382/195 |

(Continued)

FOREIGN PATENT DOCUMENTS

EP 0854433 A2 7/1998
WO WO 2012027886 A1 * 3/2012

OTHER PUBLICATIONS

UK Intellectual Property Office Search Report, dated Apr. 15, 2014, for Patent Application No. GB 1317856.1.

*Primary Examiner* — Aaron W Carter
(74) *Attorney, Agent, or Firm* — Conley Rose, P.C.

(57) ABSTRACT

A method for creating a text label for a first digital image includes a portion of a second digital image. The first digital image includes a plurality of pixels selected from the second digital image. The first digital image also includes at least one non-text string element. A computer processor is configured to search the first or second digital images for a text string and identify whether the text string is a candidate text string based on at least one first criteria associated with the said text string. Upon determining the text string is a candidate text string, the method creates a text label for the first digital image based upon the candidate text string.

21 Claims, 6 Drawing Sheets

(56) References Cited

U.S. PATENT DOCUMENTS

| | | | |
|---|---|---|---|
| 2013/0332905 A1* | 12/2013 | Vikutan | G06F 11/3684 717/124 |
| 2014/0212038 A1* | 7/2014 | Dejean et al. | 382/176 |
| 2014/0325482 A1* | 10/2014 | Simons | G06F 11/3684 717/124 |
| 2014/0325484 A1* | 10/2014 | Gillaspie | G06F 11/3684 717/124 |
| 2014/0355835 A1* | 12/2014 | Rodriguez-Serrano et al. | 382/105 |

* cited by examiner

METHOD FOR CREATING A LABEL

CROSS-REFERENCE TO RELATED APPLICATION

This application claims the benefit of U.S. Provisional Patent Application Ser. No. 61/816,111 filed Apr. 25, 2013, and United Kingdom Patent Application No. 1317856.1, filed Oct. 9, 2013, both of which are incorporated herein by reference in their entirety for all purposes.

STATEMENT REGARDING FEDERALLY SPONSORED RESEARCH OR DEVELOPMENT

Not applicable.

BACKGROUND

The present disclosure relates generally to methods and systems for creating a text label for a digital image object, for example, for use with creating computer scripts for remote testing of software applications.

In recent times, more and more computer programs are being developed and used to facilitate aspects of modern life. As computing power and demand for new software features increase, so does the complexity of software products and the code that drives them. This includes increased inter-operability with different devices and software applications. As the computer application and device market becomes more competitive, the number of different device types and operating systems also increases. A program developer is therefore often faced with various devices using various communication protocols and various other software applications to take into account when developing new software. As a result, the intended software product becomes increasingly prone to errors, flaws, failures, or faults (otherwise known as 'bugs') in the program. Typically, these 'bugs' are only discovered when the software is run. The testing of a software product, pre-launch, is therefore important to a software developer.

Software test engineers commonly test the performance of a program both pre and post launch. When performing testing, it is desirable to test out the software on a large number of devices and operating systems to ensure the product is ready for widespread sale for (and can be supported by) all types of computer system. This can be a time consuming exercise whereby the test engineer will ideally want to test devices remotely, rather than having to be physically present at each device under test. Typically the same test will need to be executed a number of different times on the same operating system. Furthermore, when having to perform the same test on a number of different devices, the test engineer would ideally want to run the same sequence of steps without actually having to input each and every step for every test.

One of the most important times to test software is when new versions of the software are released. When such new versions are released, a development team typically creates a "candidate" version of the software. The software testers then test it to find bugs and send the candidate version back to the development team for improvement. The development team then creates a new "candidate". The testers then re-test it to find further bugs and again send it back to development. This loop continues until the software works correctly and it is delivered to customers.

At some further point in time, the development team will typically add some new features to the existing program. The testers then not only have to test the new features, but also that the old features have not 'broken' (i.e. ceased to operate as desired) with the introduction of and/or interaction with the changes. This is called "regression testing". Therefore over the life of a software product, a single test case will be executed 10s, 100s, possibly 1000s of times.

Test scripts are used to test the whole or part of the functionality of the program/system under test. Running the test script allows the program/system under test to be tested automatically. Some testing programs have been developed to remotely test programs and systems. One such software tool to help software engineers automate the testing process by forming a common test script is 'EggPlant™' by TestPlant™. The EggPlant™ software takes an image from the GUI (Graphical User Interface) of a device under test and allows a user to remotely test and develop a testing script for the said device by interacting with the GUI image. Common test scripts that can be used for testing different devices/operating systems running the same program under test (or target program) are desirable to save the test engineer from writing multiple different scripts to test the same program under test.

Typical script generation requires the user creating the script to manually type or otherwise input the lines of code, including labels for items. For example, when using GUI-based software test-automation tools, the user creating the testing script will manually input a label for a graphical object that the script is interacting with, such as a 'click here' button on a screen that drives a process in the program under test. For programs with increased complexity, the script to automate the testing of the program also becomes increasingly long and complex, making it more time consuming for the test engineer to develop the script, particularly if there is a deadline to develop a script that can test all the program's functionalities.

BRIEF SUMMARY OF THE DISCLOSURE

In accordance with at least one embodiment disclosed herein, there is provided a method for creating a text label for a first digital image; the first digital image comprising: a group of pixels: selected from; and, comprising a portion of: a second digital image; and, at least one non-text string element; the method comprising the step of using a computer processor to: search at least one of the first or second digital images for a text string; and, identify whether the text string is a candidate text string based on at least one first criteria associated with the said text string; and, create a text label for the first digital image based upon the candidate text string.

The group of pixels may be a single selection area of pixels selected from the second digital image.

Identifying a text string as a candidate text string may comprise:

I) comparing the said at least one first criteria to a first threshold value associated with the said first criteria; and, II) identifying the text string as a candidate text string if the said first criteria exceeds the associated first threshold value.

At least one first criteria may be any one or more of:

I) the percentage of alphanumeric characters in the text string; or,

II) the number of characters in the text string.

At least one of the first criteria may be the % of alphanumeric characters in the text string; and, the first threshold value associated with the said first criteria is at least 60 percent.

At least one of the first criteria may be the number of characters in the text string; and, the first threshold value associated with the said first criteria is two characters.

The method may comprise the steps of:
I) creating a rating for the candidate text string based upon at least one second criteria associated with the candidate text string; and,
II) comparing the said rating to a second threshold value; and,
III) creating the text label upon the rating exceeding the second threshold value.

At least one second criteria is based upon any of:
I) a comparison based upon any one or more of:
A) the distance from the candidate text string to the group of pixels; or,
B) a spatial image noise level between the candidate text string and the image object; or,
C) the direction of the candidate text string from the edge of the group of pixels; or,
II) the language of the candidate text string.

The distance from the candidate text string to the group of pixels may be determined by the number of pixels in a direct straight line between the nearest edges of the group of pixels and candidate text string.

The spatial image noise level may be determined from any one or more of:
I) the magnitude; or
II) the frequency; or
III) the total number
of colour changes in the pixels between the group of pixels corresponding to the first image and the candidate text string.

The method may further comprise the steps of:
I) searching for one or more further text strings in the first or second digital images; and,
II) identifying each of the one or more further text strings as a candidate string based on at least one first criteria associated with each said text string.

The method may comprise the steps of:
I) searching for a first text string; and,
II) searching for a further text string if the said first text string is not a candidate test string comprising a rating exceeding the second threshold value.

Searching for the said text strings may comprise searching only within a first search area; the first search area comprising a portion of the second digital image.

The first search area may be the group of pixels in the second digital image.

The method may comprise the steps of:
I) identifying whether each said text string is a candidate text string; and,
II) creating a rating for each identified candidate text string.

The method may comprise the step of: modifying at least one of the said ratings by comparing said at least one rating to at least another of the said ratings of the plurality of candidate test strings.

The method may comprise the steps of:
I) identifying the candidate text string comprising the highest rating;
II) comparing the said highest rating with a second threshold value;
III) determining whether to create the label based upon the said determination.

The method may comprise the step of: creating the label based upon the candidate text string with the highest rating if the said rating exceeds the second threshold value.

The method may comprise the step of: defining a further search area within the second digital image if the said highest rating does not exceed the second threshold value.

The method may comprise the steps of:
I) searching for further text strings within the further search area; and,
II) creating a text label according to the methods of any of claims 1-18.

The method may comprise the step of receiving the selection area from a user input.

The first image may be associated with one or more event pixels in the second digital image; the one or more event pixels being associated with a computer application event.

The first digital image may be associated with position data providing the relative location of:
I) the one or more pixels in the second digital image that are associated with a computer application event; with respect to;
II) a point within the group of pixels of the first digital image.

The first image may be a rectangle; and, the point may be one of the corners of the rectangle.

The method may comprise the steps of:
I) creating a command line in a computer script; the command line:
A) comprising the label; and,
B) being associated with the first digital image.

The command line may comprise instructions to:
I) search a third digital image for the group of pixels corresponding to the first digital image; and,
II) execute a computer application event associated with one or more pixels in the third digital image using the position data.

The said processor may be located on a first computing device; and, the second digital image may be received from a second computing device remote from the first computing device.

The method may comprise the step of creating a computer program script, wherein the script:
I) comprises the said label; and,
II) is configured to control the second computing device.

The step of searching for a text string may comprise:
I) identifying a text string; and,
II) truncating the text string up to a predetermined number of characters.

Searching the first or second digital image for a text string may comprise: using an image to text converter.

The image to text converter may use optical character recognition.

In at least one embodiment disclosed herein, there is provided a computer readable medium comprising instructions configured to give rise to any of the methods as presented herein.

In at least one embodiment disclosed herein, there is provided a computing device comprising: the said processor and; a memory device comprising instructions configured to give effect to any of the methods presented herein.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention.

It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
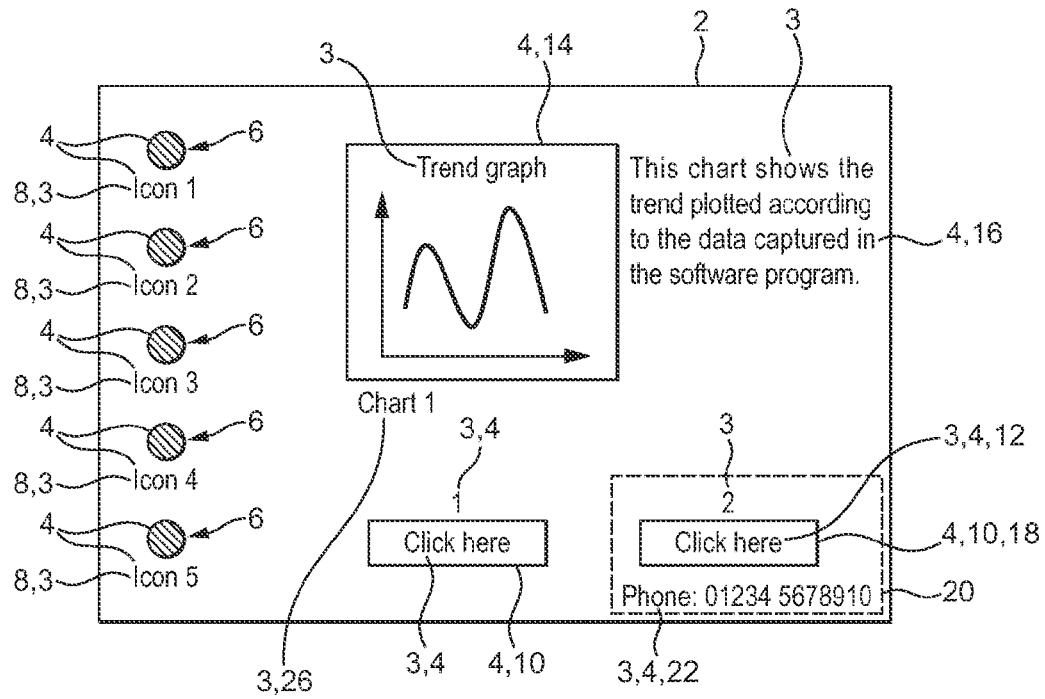
FIG. 1 shows an example of a digital image comprising various image objects and a selection area.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections.

A method for creating a text label for a group of pixels will now be described in detail with reference to FIGS. 1 to 9.

The text label is preferably used to describe, within the test description, a first (reference) image when creating a software testing script 54. The first image 20 comprises a group of pixels 20 selected from a second digital image 2, as shown in FIG. 1. The software script is preferably used for testing other pieces of software, also referred to herein as 'target software'.

When creating the testing script 54, the user typically navigates the GUI images (second digital images 2) output by the target software run on one operating system/computer system and creates lines of code that allow the testing script, when run, to automatically navigate and test the target software instantiated on different computer systems. The user may want to include one or more lines of the script that, when run, automatically activate a particular application event that is activated via the GUI under test. Such event may be executable commands that tell the target application program to perform a further series of steps or actions.

To create such a line of code, the user typically selects a groups of pixels by defining (e.g. drawing) a selection area 20 within the second image 2. The group of pixels is stored as a first digital image (or reference image). Preferably this is done by drawing a rectangular box using an input device such as a computer mouse. The relative position, (typically using pixel coordinates), between the pixel position of the event and a reference pixel position within the first image is defined and stored along with the reference image. The line of code includes a label to define the particular group of pixels as exemplified in FIG. 9.

When the testing script is run, it typically operates upon one or more further images of a GUI of a computer system running the target software. When reaching a line in the script associated with a first image, the further GUI image is searched for a group of pixels that matches the group of pixels corresponding to the first image. Typically this matching is accomplished by comparing the current full on-screen digital image of the GUI with the reference image 20.

This comparison preferably uses one or more visual analysis algorithms. An example of a suitable algorithm is a pixel-by-pixel comparison of the colour levels between the reference image of the image object 18 and the digital image 2, to see if they match within a tolerance. For example, if a pixel in the reference image is red, then the algorithm will check that the corresponding pixel in the current on-screen image is red. If all the pixels in the on-screen image match the pixels in the reference image then that area is "matched". Other algorithms may be used to match the pixels in the reference image to that of the further GUI.

Creating the Label

FIG. 1 shows an example of a digital image 2, comprising various image objects 4 including text strings 3. In this example, the image 2 comprises a number of image objects 4 including five circular 'button-like' objects 6 on the left-hand side of the image, wherein text string objects 8 labelled "Icon 1-5" are located immediately beneath each button 6. The image 2 also includes two rectangular buttons 10 with an internal "click here" text string 12, and a chart 14 with text strings to the right hand side 16 and bottom hand side 26. In FIG. 1, a selection area 20 is shown covering the right hand most rectangular button 18 with a "click here" string 12 inside. In this example, the "click here" string 12 within the button 18 are the image objects associated with the event that the user wishes to identify in the testing script (so that the event is activated when the script is run).

The pixels or set of pixels that correspond to the event in this example are located under the "k" in "Click here" 12. This selection area 20 is preferably drawn by the user intending to select the rectangular button 18 labelled 'click here' 12. The selection area is stored as a first digital image together with the relative pixel position of the activating pixels underneath the "k".

The relative position of the activating pixels may be defined relative to the first image in any suitable way including defining the position from a particular corner of the first image. For example the activating pixel/s underneath "k" may be defined by being 600 pixels right from, and 200 pixels down from, the top left corner of the first image defined by the selection area 20.

The first image may contain a single image object or a plurality of image objects or any suitable group of pixels. For example the selected image object may comprise a collection of image objects and/or parts of image objects.

Once the reference image 20 has been identified for the desired image object 18, text strings are searched for within the digital image 2 for providing a suitable label for the line of code in the script. In this example, text strings 3 are initially searched for within the selection area 20. This may be searched for within the stored first image and/or within the same group of pixels in the second image 2.

Figure 8:
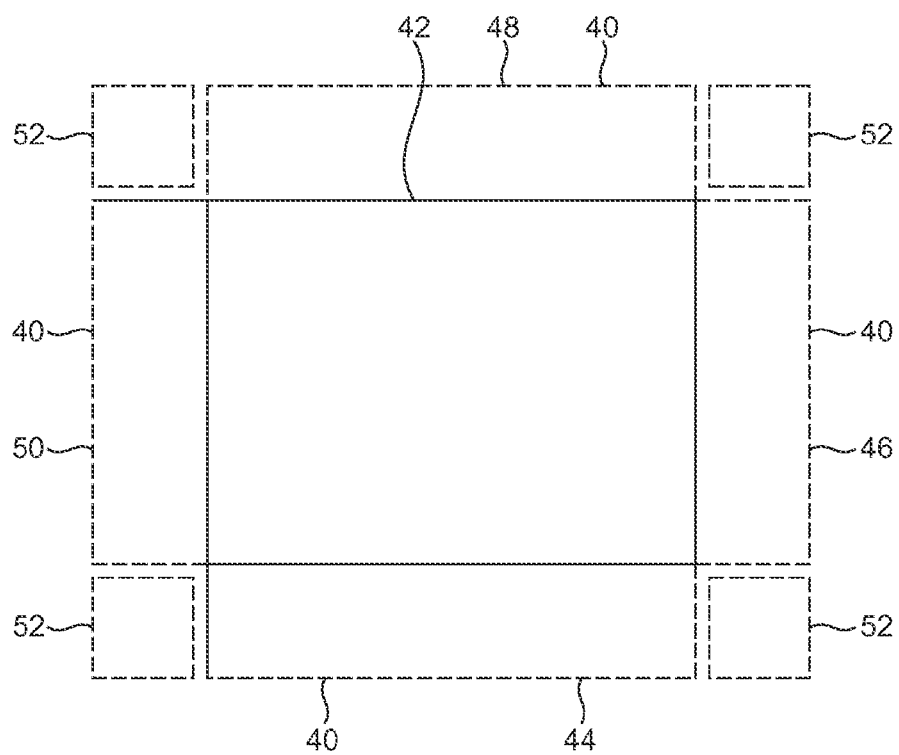
FIG. 8 shows an example of an initial search area and further search areas.
Figure 9:
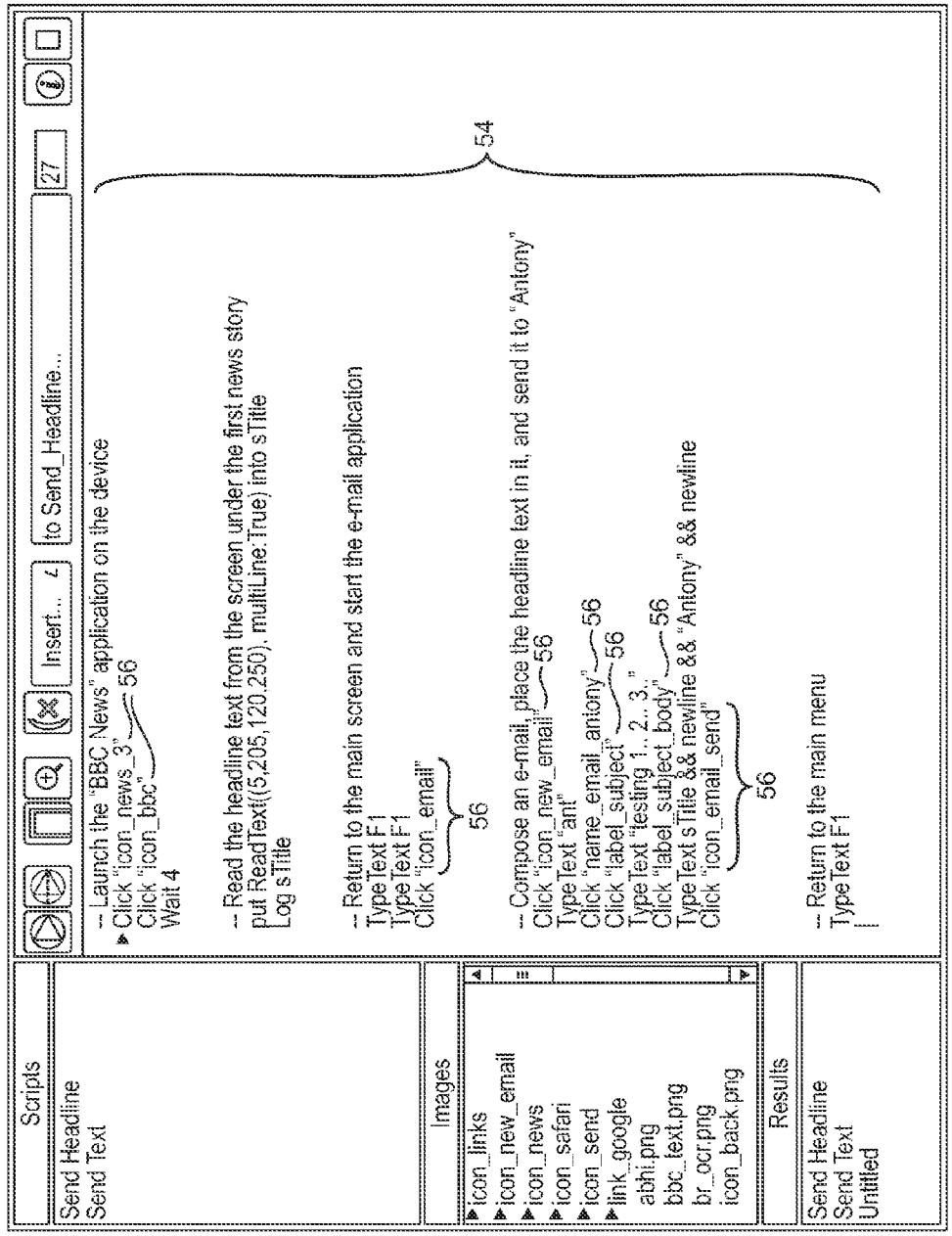
FIG. 9 shows an example of a computer script comprising labels.

Each string 3 found is analysed to determine if it is a candidate text string for consideration as a label for the identified object 18. As stated above, the typical use for the label may be for identifying an image object 18 in a testing script as shown in FIG. 8 which shows a script 54 generated by a user where labels 56 are inserted after each command "Click". Any use for the label may be contemplated. This analysis uses one or more first criteria associated with each text string 3 and compares each first criteria with an associated threshold value. For example, as discussed later, the first criteria may be the 'length of string' (i.e. the number of characters within the string), wherein the associated threshold value is two characters so that only text strings within the selection area that have two or more characters are considered 'candidate strings' 3. In FIG. 1, the single character "2" above the rectangular button 18 would not be considered a candidate string 3 because it does not have the minimum threshold required for the first criteria. Two further text strings 3 would also be found inside the selection area 20. These two further strings 3 are the "click here" string 12 and the text string 22 "phone; 01234 5678910". In this example, both the further strings 12, 22 would be candidate strings because each has more than two characters. Other first criteria and associated threshold values may be used in addition to or as an alternative to the first criteria used in this example. The search of the second digital image 2 for text strings 3 is preferably accomplished by performing Optical Character Recognition of the search area, which in this case corresponds to the group of pixels selected as the reference image.

Next, a confidence rating for each candidate string 3 is determined by using one or more second criteria associated with each candidate string 3. Second criteria may be any criteria such as location of the text string with respect to the identified object and/or language of the text string. Each second criteria is compared against one or more thresholds or rules associated with the particular second criteria. The results of the comparisons determine the confidence rating of each candidate text string 3. If, for example in FIG. 1, a higher confidence rating is given to strings nearer the centre of the first image, as compared to strings nearer the edges of the first image, then the "click here" 12 string would be given a higher confidence rating than the "phone" string 22.

Figure 2:
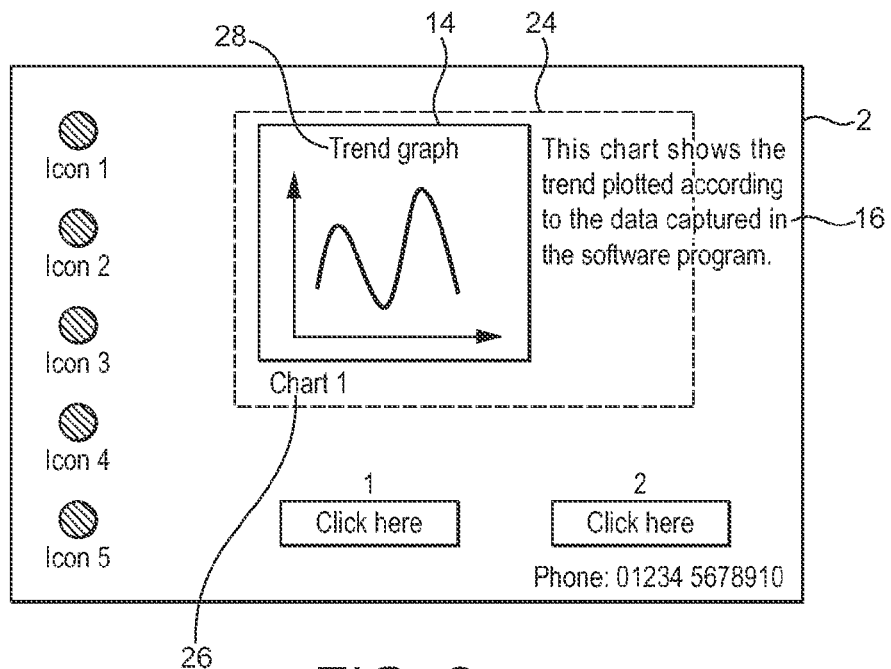
FIG. 2 shows the digital image of FIG. 1 with a different selection area.
Figure 3:
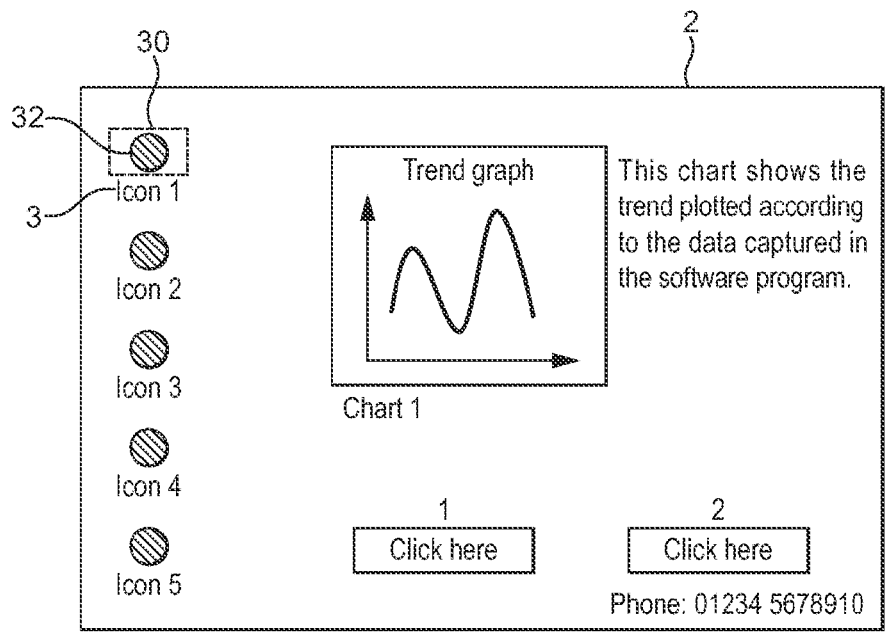
FIG. 3 shows the digital image of FIG. 1 with a further different selection area.

Similarly, FIG. 2 shows the same second digital image 2 of FIG. 1, wherein the selection area 24 is a rectangle incorporating the graph 14, the text string "Chart 1" 26 below the graph 14 and part of the four line text string 16 to the right hand side of the graph 14. The identified object in this example would be the graph 14 which has a hyperlink if the user (of testing program) clicks anywhere on the graph. The text strings 3 found when searching the selection area 24 would be:

the truncated part of the four line text string 16 to the right hand side of the chart 14,
the string "Trend graph" 28; and
the string "Chart 1" 26.

In this example two first criteria are used to determine whether or not the text strings 3 are candidate text strings 3. These first criteria are:

the number of characters in the text string 3, where the minimum threshold is two characters; and,
the number of special characters in the text string 3, where the threshold is no more than 40% special characters within the text string 3.

Using these two 'first criteria', all three of these text strings 16, 26, 28 would be candidate text strings in this example. The confidence ratings for each candidate string 3 would then be determined using one or more second criteria associated with the candidate text strings 3.

For example, a lower confidence rating may be given to the truncated four line text string 16 because it is located to the right of the group of pixels in the selection area 24 (corresponding to the first digital image). Whereas a higher confidence rating may be assigned to the other two text strings 26, 28 which are in the preferable directions/locations of:

Towards the bottom of the first image for "Chart 1" 26, and,
Towards the bottom of the first image for "Trend graph" 28.

In this example, if rules are used to prefer text strings 3 towards the top of the image, the candidate string "trend graph" 28 will be assigned a higher confidence rating than the string "Chart 1" 26.

However, if a rule is used instead, that assigns a higher confidence rating to candidate text strings 3 towards the bottom of the selection area 24, then the text string "Chart 1" may be assigned a higher confidence rating than the string "Trend graph" 28. In either example of using different rules when analysing second criteria, a candidate text string 3 (either "Chart 1" 26 or "Trend graph" 28) is selected based upon the highest confidence rating, that is in turn used to create a label for the identified image object 14.

Figure 4:
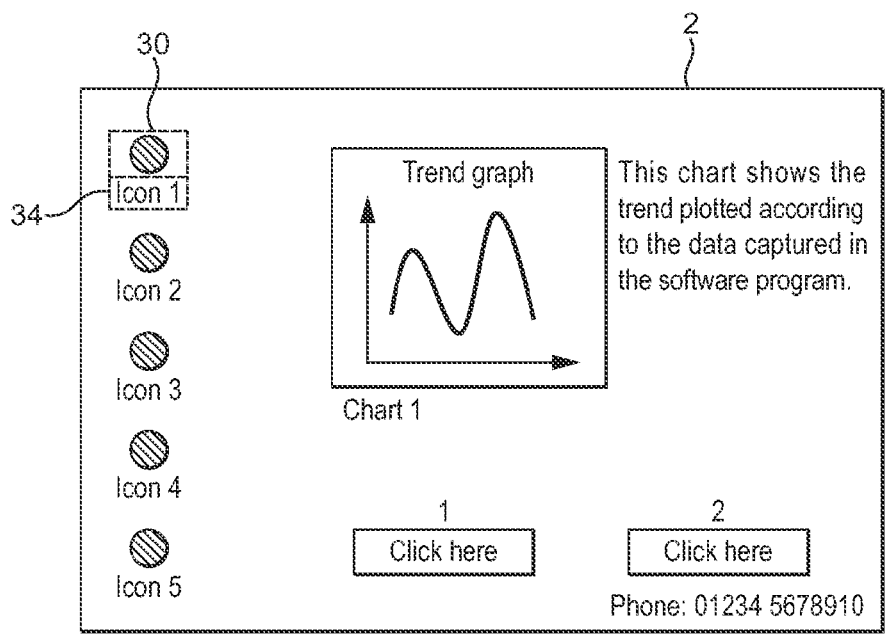
FIG. 4 shows the digital image of FIG. 1 with a different selection area bordering the selection area shown in FIG. 3.

FIG. 3, again, shows the same second digital image 2 as FIG. 1 or 2, wherein the selection area 30 (corresponding to the group of pixels in the reference image) only encompasses the topmost circular image object 32 on the left hand side of the image 2. The pixels which activate the desired event in this example are any of those within the boundary of the circular image object 32. When searching for strings inside this selection area 30, no text strings 3 are found. Upon finding no text strings 3, the search area may then be re-defined to search for further text strings 3. In this example, text strings outside of the reference image defined by the selection area 30 are searched for. FIG. 4 shows a further search area 34 defined automatically by the computer processor, wherein the second search area 34 borders the first search area 30 at the bottom side of the first search area rectangle.

In all the above examples, the first or initial search area searched is the same as the selection area that is used to define the reference image, however in principle the initial search area used to find text strings 3 may be all or any part of the digital image 2.

Furthermore the pixel or set of pixels used to activate the application event may be inside or outside the reference image. A set of pixels representing an event may be both inside and outside the reference image (i.e. spanning across the edge of the reference image).

Figure 5:
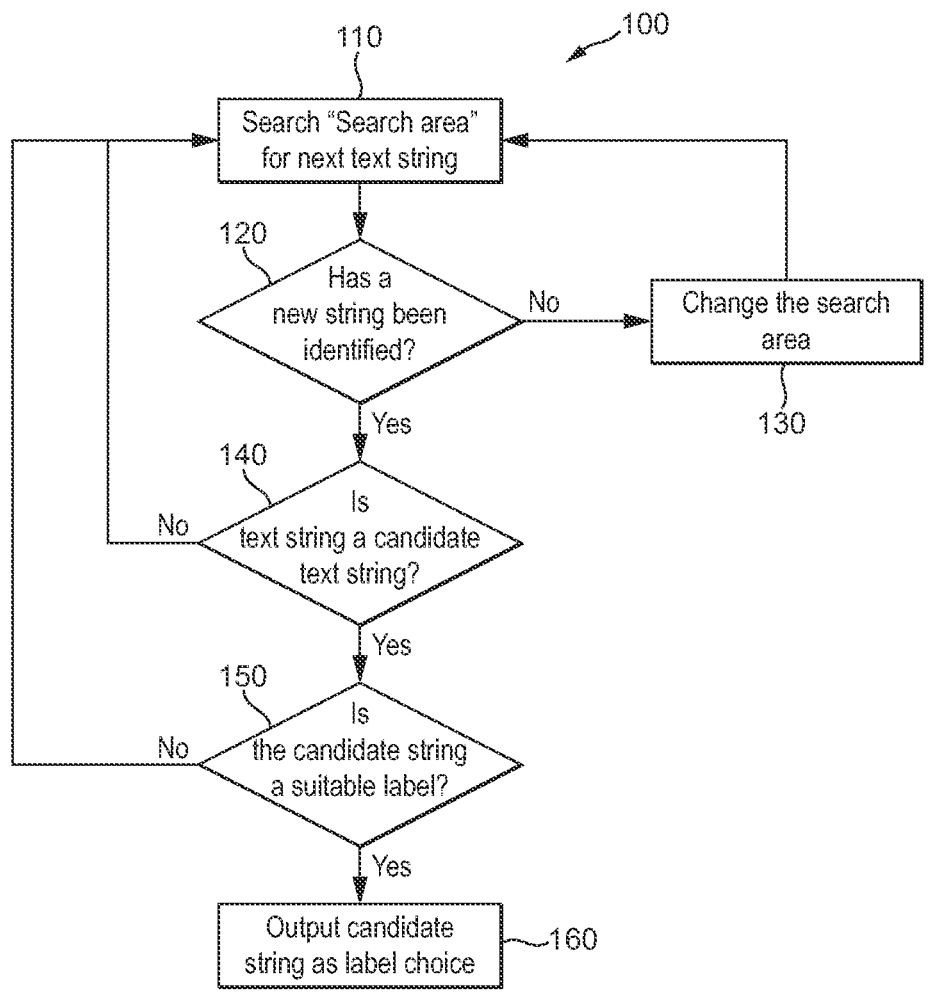
FIG. 5 is a flow diagram of an example of a method for outputting a text label.

FIG. 5 shows an example of a method 100 for outputting a candidate text string as a label choice for an identified image object 3. This method may be modified according to any of the methods and features as described herein. Firstly, at step 110 the search area is searched for the 'next text string'. At step 120, if no new string is found, the search area is changed at step 130 and searching starts again at step 110. If however at step 120, a new text string is found, then step 140 determines whether or not the identified new text string 3 is a candidate text string 3. If the text string 3 is not a candidate text string 3, then step 110 is initiated again and a search for the next text string 3 commences. If however the text string 3 is determined to be a candidate text string 3 at step 140, then step 150 determines whether or not the new candidate text string 3 is a suitable label or is suitable for deriving a label from. Typically, this would be done by comparing the second criteria of the candidate text string 3 to the appropriate rules and thresholds associated with the criteria and assigning a confidence rating to the string 3. Step 150 would then determine whether or not the discussed confidence rating for the string is above a minimum threshold for label output. If the determination at step 150 finds that the currently analysed text string 3 is both a candidate text string 3 and has a confidence rating above the threshold, then the text string is output for label creation at step 160. If step 150 finds that the text string 3 does not have a confidence rating above the threshold level, then step 110 is initiated again to search for the next text string within the same search area.

The example method shown in FIG. 5 is looking for the first text string 3 found within the search area (or further defined search area) that meets the criteria to be a candidate text string 3 and has a confidence rating above a confidence rating minimum threshold. The determination of the candidate text string 3 at step 140 may use any method or process as defined herein, for example that shown in, and described by FIG. 7.

Figure 7:
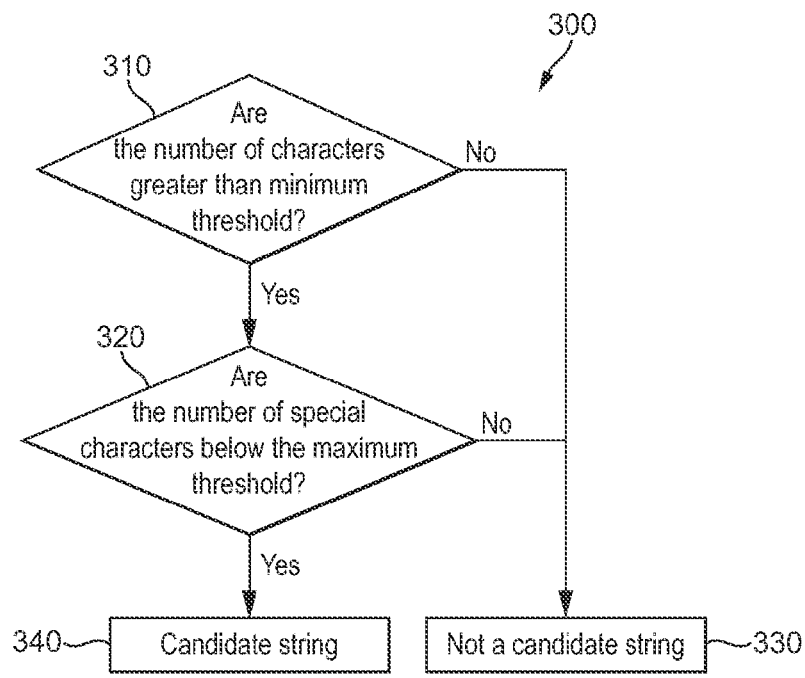
FIG. 7 is a flow diagram of an example of how to determine if an identified text string in the search area is a candidate string.

FIG. 7 is a flow diagram showing the steps in an example method 300 of determining whether or not the identified text string 3 is a candidate text string 3. Firstly, step 310 determines whether the number of characters in the string 3 is greater than the minimum threshold. If it is not, then step 330 returns that the text string 3 is not a candidate text string 3. If it is, then step 320 determines whether or not the identified text string 3 has a number of special characters above the maximum threshold of the first criteria. If the number of special characters in the identified text string 3 is above the threshold (for example 40%), then step 330 returns that the string 3 is not a candidate text string 3. If step 320 determines that the number of special characters is not above the maximum threshold then step 340 returns that the identified text string 3 is a candidate text string 3. The method 300 of FIG. 7 may be modified by any suitable method step, process or feature as described herein.

Figure 6:
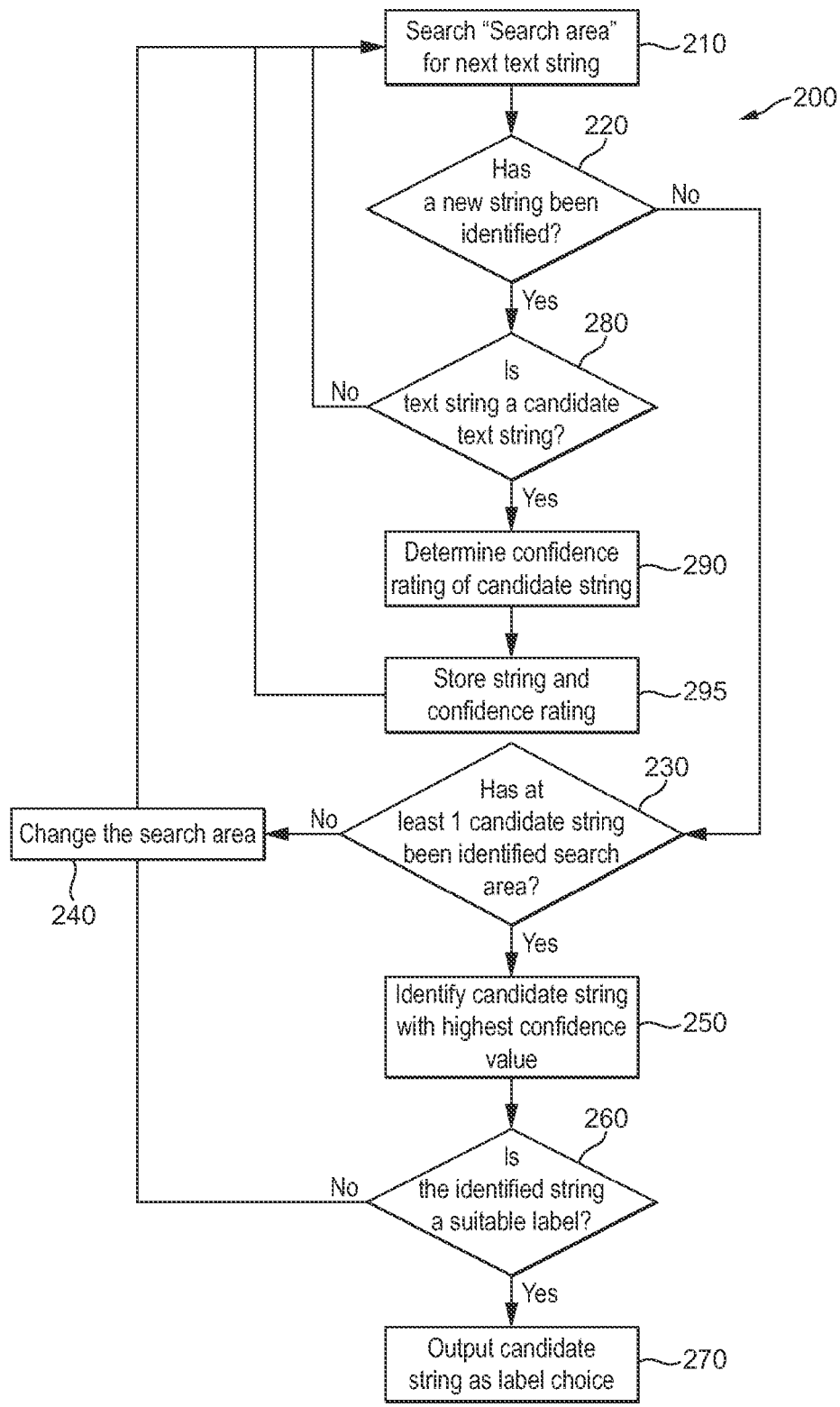
FIG. 6 is a flow diagram of a further example of a method for outputting a text label.

FIG. 6 describes an example of a method 200 for creating a label for an image object 4, whereby the method 200 collects all of the text strings 3 in a search area, identifies whether or not the text strings 3 are candidate text strings 3 and assigns a confidence rating for each candidate string 3. Out of all the candidate text strings 3, the text string 3 with the highest confidence rating is identified. It is determined whether the text string 3 with the highest confidence rating is suitable be output as a text label. The method 200 starts at step 210 by searching the area for the 'next text string'. At step 220, a decision is then made as to whether or not a new string has been identified. If no new string has been identified, step 230 determines whether or not at least one candidate text string 3 has been identified in the search area. If no text strings 3 in the search area have been identified, then step 240 proceeds to change the search area and searches for the next text string 3. If at least one candidate string 3 has been found in the search area, then the one or more strings 3 are analysed at step 250 to determine the string 3 with the highest confidence rating. Step 260 then determines whether or not the identified text string 3 with the highest confidence rating is suitable to be output as the label (for example, by using a threshold for the minimum confidence rating). If a suitable candidate text string 3 is found with a confidence rating above the associated threshold, then step 270 outputs the string for label creation.

Returning to step 220, if a new string 3 has been identified, then step 280 determines whether or not the text string 3 is a candidate text string 3. This may be determined using any method as described herein, including that shown in FIG. 7. If the string 3 is not a candidate text string 3, then step 210 is initiated again to search the search area for another 'new text string' 3. If the 'new text string' 3 is determined to be a candidate text string 3, then the confidence rating of the candidate text string 3 is determined at step 290 and then stored at step 295 before step 210 is initiated again to search for another text string. The example method 200 as shown in FIG. 6 may be modified according to a method step/s or feature/s as described herein.

Variations, Modifications and Alternatives

Examples of methods for creating a label for an image object have been described above. Any of the examples may be modified in any suitable way including, but not limited to, the following variations.

Preferably, the image object associated with the desired computer application event (for example an on-screen icon, button, text string etc.) is at least partially (preferably entirely) contained within a selection area of the second digital image that is used to define the reference image.

The label may, in principle, be any label for any particular use, for example inserting a label corresponding to the identified image object into a computer program script. In principle, the label may use any characteristics of any language but, preferably, uses any ASCII character or numbers of ASCII characters. For example letters, numbers and special characters, such as '@' and '!'.

The script may be a script written in any suitable scripting language, for example SenseTalk™. Preferably the script is a computer program that is loaded onto a carrier device such as a disc, memory stick or any other suitable electronic data carrier.

The term "digital image" 2 is taken to be a numeric representation of a two-dimensional image. The digital image 2, in principle, may be a vector or raster image type. Preferably, the second digital image 2 comprises a plurality of pixels, wherein image objects 4 preferably comprise one or more, preferably a plurality of the digital image pixels. The first digital image selected from the second digital image comprises at least one non text string element. The second digital image may be an exact copy of a snapshot of a GUI from a remote computer than may be scaled or manipulated in any way.

The terms "digital image" and "image object" are otherwise defined by the standard terms used by the skilled person in the art of computer image processing. An image object 4 may be, for example, any one or more of, a button, an icon, a chart, a text string or any other image object 4 that is, at least partially (preferably entirely), contained within the digital image 2. The second digital image 2 is preferably the image of a Graphical User Interface (GUI). This image 2 may be an image 2 of the GUI of a computer device that a program testing engineer directly interacts with, or is an image 2 received from a remote computer, for example a computer that the engineer is testing remotely. An image 2 received from a remote computer may be an image 2 of the GUI of that remote computer. This image 2 may be of any format, including BITMAP, JPEG, PNG or any other suitable digital image data type.

The method, as presented herein, may run on any suitable computer system comprising a computer processor. This may include any suitable processors, such as an INTEL processor or an ARM™-based processor. Preferably the processor is a processor for a mobile computing device such as a smart phone. The processor may be in electronic communication with any other suitable computing component, such as a RAM, ROM, and/or any other type of memory device including solid state or disc drives and any other suitable computer peripherals including communication devices that may be required to communicate data from and/or to a remote computer or other data providing and/or receiving systems. The script or method steps may be run using any suitable operating system software, for example any of Windows, UNIX, LINUX, or Android.

The selection area 20, 24, 30 of the second digital image 2 may, in principle, be any two-dimensional area of the image 2, comprising, at least, a portion of the digital image 2. The two dimensional area may in principle comprise at least a portion of a 2D image or a 3D image. Preferably, the selection area 20, 24, 30 comprises a portion of the second digital image 2. This area may be defined by a user on a computer system and/or a user on a remote system. The selection area 20, 24, 30 may be user generated or automatically generated using one or more computation steps. The selection area 20, 24, 30 may also be pre-defined. The selection area 20, 24, 30 may, in principle, be any two dimensional shape. A preferred example of a selection area 20, 24, 30 is a rectangular box.

The searching of the digital image 2 for a text string 3 is achieved using a computer processor. The intention, when searching for a text string 3, is to provide a label for the identified image object 4 associated with the desired application event. Searching a text string 3 within the first or second digital image 2 may comprise any suitable method for identifying a text string 3 within a digital image 2. For example, Optical Character Recognition (OCR) may be used. OCR could be used to translate all the object text strings in the whole of the second digital image 2 into computer readable ASCII text strings 3. Alternatively only the group of pixels corresponding to the first digital image may be searched using OCR, for example performing OCR in a search area defined by rectangular box 20 in FIG. 1. Preferably, the search area is/or includes the selection area.

When a string 3 is excessively long (for example comprising more than 16 characters), the text string may be truncated to the maximum character length (for example truncated to the first 16 characters). This truncation may be done before or after examining whether or not the text string 3 is a candidate text string. The text string may be truncated to a pre-determined set number of characters by removing characters from the end of the string. This predetermined number may be set by the user. In principle, any maximum string length truncation threshold may be used.

Determining whether or not a text string 3 is a candidate text string 3, depends on at least a first criteria associated with the text string 3. Any one or more first criteria may be used to determine if the string 3 is a candidate text string 3. Any of the first criteria may be compared against a threshold value or rule associated with the first criteria to determine whether the string 3 is a candidate string 3. In principle, the first criteria may be any suitable criteria associated with the text string 3, including criteria inherent to the text string 3 (for example number of characters in the string 3 or number of special characters in the string 3) and/or criteria that are not inherent to the text string 3 (for example a comparison of the text string with another property).

Preferably, if one of the first criteria is text string length, the associated rule for the criteria may be a minimum number of characters. For example a candidate text string 3 must comprise a minimum of two characters. Thus, a threshold for the first criteria in this example would be two.

Additionally, or alternatively, the text string 3 may be considered as a candidate text string 3 when the number of special characters in the text string 3 does not exceed a particular number or percentage of the total numbers of characters in the text string 3 or the truncated text string 3. When determining whether or not the text string is a candidate text string, any number or combination of suitable criteria and comparative thresholds (or rules) may be used. This may equally be expressed as the minimum number of ASCII characters. For example the minimum number of ASCII characters for a text string to become a candidate text string may be 60%. Preferably the threshold of "minimum number of ASCII characters" or "no-special characters" may be between 60% and 80%. The term "special characters" may be defined as those characters not representing words or numbers.

A confidence rating may be derived for each candidate text string 3 from any of the first criteria and/or any further criteria associated with the identified candidate text string 3.

Preferably, a confidence rating is generated using criteria other than the first criteria used to determine whether a text string 3 is a candidate text string 3. A further threshold may be provided upon which the confidence rating is compared. If the confidence rating is above the threshold, then the candidate text string 3 may be output for use as the label for the image object. The label in the line of code may be derived in any way from the output text string 3, for example using the whole or any one or more of the characters in the text string 3. The candidate test string, or selected part of the candidate text string may be appended to a standard prefix, for example, for a text string "test1", the label would be "img.test1". Another example could be to append the candidate string to a prefix based on the script/suite name.

Finding the candidate text string for output label creation may be accomplished by any suitable means or method steps, including finding the first candidate text string 3 that satisfies a confidence rating minimum threshold. Another example is finding a set of candidate text strings 3 (for example finding all of the candidate strings 3 in a searched area) and determining the confidence levels of the strings 3.

In an example where a plurality of candidate strings 3 are found and their confidence ratings are compared before selecting one string to be the label, the strings 3 may be re-ordered (i.e. the confidence ratings of the strings changed and/or normalised) into a different confidence rating ranking order. This may be achieved by comparing the confidence ratings of the text strings 3 in the analysed sets and/or comparing any of the criteria between the text strings 3 in the analysed set. An example of this is to lower the confidence ratings for candidate text strings with identical characters since the identical string looks less like a unique label and more like an overall application name (or common word such as "the"). For example, if there are 4 candidate strings and 3 of them are identical, then the non-identical candidate string may have its confidence rating raised and/or the three identical text strings may have their confidence ratings lowered.

The candidate text string 3 with the highest confidence rating in the set or re-ordered set may then be used as the output text string for label creation.

The further criteria (or otherwise known as second criteria) may be any suitable criteria associated with the text string 3 including one or more inherent properties of the text string 3 and/or one or more properties of the text string 3 that are derived from comparing the text string with another external property, for example comparing one attribute of the text string 3 to an attribute of the reference image.

When the user creates the script by selecting an area 20, 24, 30 of the second image 2 to be the reference image, he/she will typically draw an area over, or very close to, the image object 4 in the second image 2 used to signify the activate-able computer event on the screen. Second criteria such as an inherent property of the string (such as its position, direction, reading direction etc.) may therefore be evaluated to determine (or contribute to) a confidence level and compare the property to one or more positions or pixel locations associated with the reference image (for example an edge, nearest edge or centre of the reference image). This is advantageous because it is likely that the best candidate string for the label is located either within the reference image or immediately adjacent the reference image.

For example, a second criteria could be associated with the relative locations, within the second image 2, of the string and group of pixels that define the reference image. A second criteria may be the distance from the group of pixels, 20, 24, 30 to the text string 3.

This may be determined in any suitable way including the number of pixels in a direct straight line between the nearest edges of the group of pixels and the candidate text string.

Another second criteria, in addition to or as an alternative to any other second criteria, could be the relative location (direction) of the text string 3 with respect to the edges or centre of the reference image.

Another second criteria, in addition to or as an alternative to any other second criteria, could be the amount of spatial frequency noise between the identified object and the text string 3, for example the method could set a threshold for the value of the spatial frequency component below a particular spatial frequency.

Additionally or alternatively, noise may be determined by any one or more of:
  the magnitude; or
  the frequency; or
  the total number
of colour changes in the pixels between the edge of the group of pixels corresponding to the first image and the candidate text string. Preferably the confidence rating is based upon minimising all of the said colour change criteria. For example, an area between the string and the edge of the reference image with a single uniform colour would have low values for each of these colour change criteria and therefore given a higher confidence rating that an area with a single step from light blue area to a dark blue area where the magnitude of the single colour change would be higher.

Another second criteria, in addition to or as an alternative to any other second criteria, could be the reading direction of the text in the string 3. For example, the user may specify a particular language to search for the desired label such as Korean vertical writing 'serosseugi'. The selected language may dictate the preference of the reading direction of the particular text string 3 and may be used to assign a higher confidence level to text strings 3 written in that particular direction to those written in a different direction. In addition or as an alternative to this criteria, the preferred language of the text string may also factor into providing a different confidence ratings to the position of the text string with respect to the edges of the reference image. For example, if English was selected as the preferred language of the label, then a higher confidence rating would be assigned to strings located towards or near the top or bottom of the reference image because they would be the most likely areas to put a label given that English is written from left to right.

Another second criteria, in addition to or as an alternative to any other second criteria, could be whether or not the text string 3 is located inside or outside of the reference image. For example, a text string 3 located within the reference image could be given a higher confidence rating than a similar text string 3 located outside of the reference image.

If no suitable candidate text string 3 is found within the current search area (i.e. none of the candidate text strings 3 had a confidence rating above the minimum confidence rating threshold), then the search area may be redefined and any of the steps described herein may be repeated for finding candidate text strings 3 and/or determining candidate text string confidence levels.

In principle, any suitable further defined search area 40 may be used, including a further search area 40 that contains at least part of the previous search area, the whole of the previous search area or none of the previous search area. Each further search area 40 preferably comprises a portion of the second digital image 2 that was not covered by the previous or any of the previous search areas. Preferably, the said further search areas 40 have at least one peripheral edge that borders at least one edge of the initial or previous search area/areas.

The size of the new (further) search area 40 may be any suitable size. For example, the height of the new search area (or the height of part of the further search area 40 extended from the previous search area) may be automatically determined by the computer by analysing the average height of the text strings 3 found in the previous search area. The new search area height may be a value (e.g. number of pixels) equal to the determined text string height, possibly added to with a further offset value to take into account of a gap in the second image 2 between the reference image and a possible further text string 3. The width of the newly defined search area may in principle be any width, for example being derived from the average length of any text strings 3 found in the previous search area/s. Preferably, when the initial search area was identical to the selection area used to define the reference image, the new search areas 40 are searched in a sequential spiral fashion around the borders of the selection area. This may start from the bottom of the selection area, up the right hand side, then across the top, then down left hand side of the initial searched area.

For example, FIG. 8 shows an initial rectangular search area 42 that was used to define the reference image. The first new search area 44 is a rectangular box extending away from the bottom edge of the initial search box 42. The second search area 46 (used if no suitable strings were found in the initial search area 42 and first new search area 46) may be a rectangular box extending away from the right vertical edge of the initial box. The third search area 48 may be a rectangular box extending vertically away (upwardly) from the top edge of the initial search area 42. The fourth new search area 50 may be a rectangular box extending horizontally away from the left hand edge of the initial box 42. The horizontal width of the first and third new search areas 44, 48 may be the same width as the initial search box 42 or greater than or less than the width. The height of the second 46 and fourth 50 search boxes may have the same height as the initial search box 42 or greater than or less than the height. The corner areas 52, as shown in FIG. 8, may or may not be included by any of the first, second, third or fourth further search areas. For example, the bottom two corner areas 52 may be searched for by extending the width of the first box 44 whilst the top two corner areas 52 may be searched by extending the width of the third box 48. In principle, any corner area 52 may be searched by extending any of the further search areas 44, 46, 48, 50, preferably a further search area 44, 46, 48, 50 that comprises a peripheral border adjacent to the corner box 52.

Further features are presented below which may be used in combination with any of the features described above and in the appended claims.

Manifested in a preferred embodiment, there is provided a computer user the ability to control any other computer connected through an interface, using the standard graphical user interface (GUI). A user interface which takes the form of an interactive development environment (IDE), will preferably include several functional windows therein. More particularly, window provides a command capture interface which most preferably provides a system-under-test (SUT) screen display which provides a visual depiction of the display screen generated by the system for which the operation of the interactive development environment is designed to control. Within that display there will be various graphical representations that may take the form of icons, or various buttons, message boxes, prompts or any other graphical image or control. The depiction may be an exact copy of the remote graphical user interface, a resized or scaled version, or may further include various image manipulations and transformations such as colour conversions or other manipulations as deemed suitable and appropriate for a given application.

In one exemplary embodiment, a user will preferably select one or more of graphical representations, such as by drawing a selection frame or box about a portion of the SUT screen display. Once a desired graphical representation has been selected, the user will next choose to save the selection as an image (reference image). While in an embodiment the image naming may preferably be automated either partially or wholly. Automation involves the integration of Optical Character Recognition (OCR), which is preferably used to process the selected image to determine whether there is text available that may be used to provide a default name for the selected image. The OCR processing may be bounded to only within the selected image, but preferably a larger area including pixels adjacent to and outside of the image will be scanned for text. Furthermore, remote or distal locations may also be used, such as title bars or other text that may be predetermined to present at a particular location.

Particular known associations or clues may be used to logically find associated text, for exemplary purposes such as the recognition of particular coloured regions surrounding a graphical icon and within which naming text is commonly associated.

The incorporation of OCR is particular useful for such elements as icons, which frequently will include the application name or similar relatively unique identifiers. Other elements, such as for exemplary purposes message boxes, command boxes, and text boxes, will have adjacent text or text within the image that will provide relatively unique identifiers. These may be element titles or headings, captions, or other text. It will be understood that these identifiers may not always be unique, and so instead may be referred to herein as relatively unique identifiers. However, where subsequent elements are selected that have the same text within the image or within a region adjacent to or associated therewith as was found with a prior and already saved image, then known naming conventions for duplicate files will preferably be used to produce a unique name for the image. For exemplary purposes only, these could be the addition of a numeral that in combination with the relatively unique identifier is, in fact, unique to the collection of images being used or generated at that moment.

A command tool bar is provided which allows a user of interactive development environment to select what type of command or action will most desirably be implemented at any given state within the system-under-test screen display. These commands will most desirably replicate the functions at the system-under-test as though they were, in fact, executed directly upon that system. Preferably, such commands will include keyboard commands and mouse commands, though it will be understood that any form of user input may be emulated. Consequently, touch screen monitors, graphics pads or tablets, and any other type of primary or peripheral input device may be emulated as required and designed for. In the case of the keyboard commands, two commands may, for exemplary purposes only and not limited thereto, be implemented. The commands include a "TypeText" command and a "TypeCommand" command. These two commands permit any keyboard input available to be implemented, and yet provide a very understandable means to implement the same. In other words, where simple text must be entered, the "TypeText" command will be utilized.

Where function and command keys are to be implemented, the "TypeCommand" function may be used. These commands are most preferably higher level language commands which will later be processed by a specific language extensions processor described in greater detail herein below. Similarly, such mouse functions as "Click", "DoubleClick", "RightClick", "MouseButtonDown", "MoveTo", "Drag", and "MouseLocation( )" may be implemented. For the purposes of this disclosure, and as is commonplace in the computer arts, it will be understood that the use of parentheses denotes the implementation of a function that may include data or other variables that are being passed either from or to the function.

Special commands such as "ClickAny", the operation which will be described herein below, may also be implemented. The Operation as presented herein depends upon the graphical user interface. The myriad of possible functions and displays that may be produced as a result of an operation are extensive. For example, there are times where an operation may result in an introduction of one of a variety of controls.

Where a single entity is anticipated, the image of the entity can be stored through the command capture interface window, and, when such image is later detected during execution of a script, an appropriate action can be selected, such as the "Click" command which would represent a mouse click upon a particular point in the screen. While many times this "Click" command may be executed directly upon the entity which newly appears upon the system-under-test screen, the direct action upon such an entity is not required. Instead the user of interactive development environment has complete control over any of the user actions that may be relayed to the system under-test, such as providing typed text, commands, movement of the mouse, and so forth.

Consequently, the appearance of an object may stimulate any suitable action. Where such action would be to send a click on any active component that may appear on the screen, the "ClickAny" command will most preferably be provided, which enables the click to occur on any entity that may appear. Furthermore, in one contemplated embodiment, the activation of keystrokes or mouse clicks directly within the system-under-test screen may be directly transferred as commands that are captured, or there may alternatively be a button to select which initiates and subsequently stops the recording of such within system-under-test screen actions.

Since the systems and methods presented herein designed to control graphical user interfaces, several commands are contemplated herein, but once again not considered to be solely limiting or restricted thereto.

These image commands will most preferably include screen image searching commands and specific image information. Exemplary of the screen image searching commands are such commands as "WaitFor", "WaitForAny", "WaitForAll", "RefreshScreen", "ImageFound( )", "AnyImageFound( )", "ImageLocation( )", "AnyImageLocation( )", "EveryImageLocation( )", and other similar commands.

A variety of information will most preferably be obtained or obtainable with regard to specific images, through such commands as "ImageInfo( )", "FoundImageNumber( )", "FoundImageName( )", "FoundImageLocation( )" "ImageHotSpot( )", and "ImageSize( )".

Utilizing the above command set, it is possible to monitor a graphical user interface for any type or shape of image and then, responsive to the presence thereof, select a subsequent user action as though the user action were being performed directly upon the system-under-test rather than from a source or controlling computer.

In the event an unexpected event or entity appears upon the screen, the user, through the integrated development environment, has the opportunity to control the operation of the local and remote systems responsive thereto. For example, if a particular object is expected to appear upon the system-under-test screen within a particular time interval, and the time expires prior to the object appearing, then it would be possible for a script entered within script window to time out and cause an error message or warning message or the like to appear upon the local computer screen.

The scripting window will most preferably provide access to functions and commands through, for exemplary purposes only, script tool bar that are commonly associated with or available through any of the various scripting languages or more fundamental programming languages. Such functionality as decision structures, loops, timers, and the various other myriad of functions available therein as are well known will most preferably be incorporated herein, in accord with the particular language incorporated herewith or developed for operation herein. One such example is "SenseTalk", though other suitable scripting languages are certainly contemplated herein, and will be dependent upon the preferred operating platform or cross-platform capability desired.

Most preferably, interactive development environment will additionally include a window which provides access to various organizational functions, which may, in the preferred embodiment, be implemented using the familiar index tab analogy. Among the available index tabs may, for exemplary purposes only, be functions such as the storage of various scripts, images results from past script executions, scheduling of planned script executions, and the identification and or the location of helper script and image files, which may be local, on a network, or located anywhere on the Web.

The presentation of the system-under-test screen is achieved by a remote GUI 5 interface. A command and image capture system is responsible for the capture of appropriate commands from command tool bar and image information such as icon. Consequently, when a user selects a particular command, such as a mouse click or the like, this command must be captured and incorporated into the appropriate scripting information. Likewise, the inclusion of an expected image or others of the herein above described image or user control commands must be incorporated.

These commands, which are not native to prior art operating systems, programming or scripting languages, are passed through to the system data, scripts and images controller. Controller is responsible for the appropriate redirection and incorporation of command, graphics and scripts between execution environment, script window, and command and image capture system. For example, when a command is received from command and capture system, this command and any associated language will preferably be inserted into scripting window.

Likewise, the passing of images from the execution environment will occur through controller. Script window, which would in operation contain an active script, may be processed directly through execution system for a real-time run, or may be passed through organizational window for storage and scheduling therein.

Ultimately, a given script will be executed through the execution system, which is configured to carry out the processes specified within a script. While somewhat simplistic in description, the execution system and execution environment are typically comprised by the local CPU, memory, OS, and the like. The command processor or CPU will effect or control much of the execution within system, but will be monitoring a diverse set of status indicators, potentially both locally and at the system-under-test, programming calls, and the like. These various items being monitored comprise in part the execution environment.

As the script is being processed, execution environment will need to call the scripting language processor, which may be an interpreter, compiler or other suitable language processor.

The scripting language has been extended in the preferred embodiment by various GUI commands and controls that are created through the command capture interface, such as the various mouse events and the like. Consequently, these commands must be processed not by the scripting language processor, but instead by a language extensions processor. As a result of the processing of the scripting language and the language extensions, an action may require to be initiated, which would be detected and triggered in the initiate action subsystem, which will relay the action back to execution environment. In the event this is an action intended for the system-under-test, such action will be relayed from execution environment through remote GUI interface.

The purpose of the remote GUI interface is to implement an interface with the remote system-undertest, preferably relatively independently of the characteristics of communications channel used and the data exchange rate associated therewith. This consists of providing client function to facilitate communication with the GUI server on the remote system-under-test, and to implement any needed out-of-band communication. Included are such operations as the client-server functions of retrieving images, sending keyboard and mouse commands, and initiating error recovery procedures as needed.

Communications channel will in the preferred embodiment include a keyboard channel, mouse channel, and a transfer of screen updates from VNC server 280 back to the remote GUI interface. Communications channel may be a high speed trunk line or cable, or may alternatively be a relatively slow-speed dial-up or RS-232 type connection.

With proper selection of components, the preferred embodiment has much flexibility to operate through diverse communications channels having very different data transfer rates and signal to noise ratios.

To achieve broader application to more and more diverse systems-under-test, remote GUI interface through a communications channel communicates with remote computer virtual network computing server or the like. The remote GUI interface and VNC server are most preferably VNC components which are readily available commercially and which operate as cross-platform components to directly interface with a remote system GUI.

Nevertheless, other standard interfaces may be supported.

Images from the system-under-test GUI will be relayed through VNC server or the equivalent back to local system remote GUI interface, and from there routed to the GUI recognition subsystem. GUI recognition subsystem dynamically scans the screen image of the remote system-under-test for any bit-map images which the initiate action subsystem is searching for. The goal of GUI recognition subsystem is to locate images and signal the presence of such images to the initiate action subsystem through an image detection signal, initiate recovery procedures such as moving the mouse cursor to locate images, or to report that the sought-after images are not available. GUI recognition subsystem cooperates with the initiate action subsystem and language extensions processor output to determine whether a desired event or image has been created and if so, to execute the desired image identification actions requested within the language extensions received from language extension processor through the execution environment.

Initiate action subsystem initiates any action requested by the language extensions received from language extensions processor, which could be active commands to type text through the keyboard or to move the mouse in a number of ways. The commands may also in the preferred embodiment include passive commands to search the screen image on a continuing basis for a specific bit-map image, and, for exemplary purposes, terminating the search after a given period of time has elapsed.

A programmerator may be provided enabling a local system to remotely operate a computer system through local scripts and selectively respond to changes in graphical displays upon a graphical user interface of said remote computer system, comprising:

a command capture interface that displays a depiction of said remote system graphical user interface display and captures user input made therein;

an automated OCR search engine that operatively searches images captured from said remote computer system, both within and immediately adjacent to said images, to detect and recognize text that may be used to automatically name said captured images;

a command language set that when processed by said local system implements both of user input emulations representative of said captured user input at said remote computer system and image processing of said remote computer system graphical displays;

a scripting language having scripting commands that control a flow of execution of said local system in combination with said command language set; and an interface for communicating between said local system and said remote computer system graphical user interface responsive to said command and scripting languages.

Embodiments disclosed herein have been described with particular reference to the examples illustrated. However, it will be appreciated that variations and modifications may be made to the examples described within the scope of the present invention.

The said methods described herein may be embodied in one or more pieces of software. The said software is preferably held or otherwise encoded upon a memory device such as, but not limited to, any one or more of, a hard disk drive, RAM, ROM, solid state memory or other suitable memory device or component configured to software. The said methods may be realised by executing/running the software. Additionally or alternatively, the said methods may be hardware encoded.

The said methods encoded in software or hardware are preferably executed using one or more processors. The said memory and/or hardware and/or processors are preferably comprised as, at least part of, one or more servers and/or other suitable computing systems.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for generating a portion of a test description for testing a graphical user interface (GUI) of a remote system under test, the method being operable to create a text label for a reference digital image utilized in the test description, the reference digital image comprising a group of pixels selected from and comprising a portion of a digital image of the GUI of the system under test and including at least one image object, the method comprising the step of using a computer processor to:

search at least one of the reference image or the digital image of the GUI for a text string;

identify whether the text string is a candidate text string based on at least one first criteria associated with the said text string;

create a text label for the reference digital image based upon an identified candidate text string; and insert the text label corresponding to the image object into the test description.

2. The method as claimed in claim 1 wherein identifying a text string as a candidate text string comprises:

comparing the said at least one first criteria to a first threshold value associated with the said first criteria; and, identifying the text string as a candidate text string if the said first criteria exceeds the associated first threshold value.

3. The method as claimed in claim 1 wherein the at least one first criteria is any one or more of:

the percentage of alphanumeric characters in the text string; or, the number of characters in the text string.

4. The method as claimed in claim 1 comprising the steps of:

creating a rating for a candidate text string based upon at least one second criteria associated with the respective candidate text string;

comparing the said rating to a second threshold value; and, creating the text label based upon the candidate text string if the rating exceeds the second threshold value.

5. The method as claimed in claim 4 wherein the said at least one second criteria is based upon any of:
a comparison based upon any one or more of:
the distance from the candidate text string to the group of pixels; or,
a spatial image noise level between the candidate text string and the image object; or,
the direction of the candidate text string from the edge of the group of pixels; or,
the language of the candidate text string.

6. The method as claimed in claim 1 further comprising the steps of:
searching for one or more further text strings in the reference image or the digital image of the GUI; and,
identifying whether each of the one or more further text strings is a candidate string based on at least one first criteria associated with each said text string.

7. The method as claimed in claim 6 comprising the steps of:
searching for a first text string; and,
searching for a further text string if the said first text string is not a candidate test string comprising a rating exceeding a first threshold value.

8. The method as claimed in claim 6 wherein searching for the said text strings comprises searching only within a first search area; the first search area comprising a portion of the digital image of the GUI.

9. The method as claimed in claim 6 comprising the steps of:
identifying whether each said text string is a candidate text string,
creating a rating for each identified candidate text string.

10. The method as claimed in claim 9 comprising the step of:
modifying at least one of the said ratings by comparing said at least one rating to at least another of the said ratings of the plurality of candidate test strings.

11. The method as claimed in claim 9 comprising the steps of:
identifying the candidate text string comprising the highest rating;
comparing the said highest rating with a second threshold value;
determining whether to create the label based upon the said comparison.

12. The method as claimed in claim 11 comprising the step of:
creating the label based upon the candidate text string with the highest rating if the said rating exceeds the second threshold value.

13. The method as claimed in claim 11 comprising the step of:
defining a further search area within the digital image of the GUI if the said highest rating does not exceed the second threshold value.

14. The method as claimed in claim 1 comprising the steps of:
searching for further text strings within a further search area within the digital image of the GUI; and,
creating a text label according to the method of claim 1.

15. The method as claimed in claim 1 wherein the reference image is associated with one or more event pixels in the digital image of the GUI; the one or more event pixels being associated with a computer application event.

16. The method as claimed in claim 15 wherein the reference digital image is associated with position data providing the relative location of:
the one or more pixels in the digital image of the GUI that are associated with a computer application event; with respect to;
a point within the group of pixels of the reference digital image.

17. The method as claimed in claim 16 comprising the steps of:
creating a command line in a computer script; the command line:
comprising the label; and,
being associated with the reference digital image.

18. The method as claimed in claim 17 wherein the command line comprises instructions to:
search a further digital image for the group of pixels corresponding to the reference digital image; and,
execute a computer application event associated with one or more pixels in the further digital image using the position data.

19. The method as claimed in claim 1 wherein the step of searching for a text string comprises:
identifying a text string; and,
truncating the text string up to a predetermined number of characters.

20. A non-transitory computer-readable medium comprising instructions that, when executed by a processor, are configured to carry out a method of generating a portion of a test description for testing a graphical user interface (GUI) of a remote system under test, the method being operable to create a text label for a reference digital image comprising a group of pixels selected from and comprising a portion of a digital image of the GUI of the system under test and including at least one image object, the instructions further configured to cause the processor to:
search at least one of the reference image or the digital image of the GUI for a text string;
identify whether the text string is a candidate text string based on at least one first criteria associated with the said text string;
create a text label for the reference digital image based upon an identified candidate text string; and
insert the text label corresponding to the image object into the test description.

21. A computing device comprising:
a processor; and
a memory device comprising instructions configured to cause the processor to perform a method of generating a portion of a test description for to test a graphical user interface (GUI) of a remote system under test, the method being operable to create a text label for a reference digital image utilized in the test description the reference digital image comprising a group of pixels selected from and comprising a portion of a digital image of the GUI of the system under test and including at least one image object, the instructions configured to cause the processor to:
search at least one of the reference image or the digital image of the GUI for a text string;
identify whether the text string is a candidate text string based on at least one first criteria associated with the said text string;
create a text label for the reference digital image based upon an identified candidate text string; and
insert the text label corresponding to the image object into the test description.

* * * * *